US007918625B2

(12) United States Patent
Kelly et al.

(10) Patent No.: US 7,918,625 B2
(45) Date of Patent: Apr. 5, 2011

(54) SUPPORT STRUCTURE FOR SEA WAVE ENERGY FARMS

(75) Inventors: Hugh-Peter Granville Kelly, Essex (GB); Malcom Van Den Bergh, Felixstowe (GB)

(73) Assignee: Trident Energy Ltd., Westcliff on Sea (GB)

( * ) Notice: Subject to any disclaimer, the term of this patent is extended or adjusted under 35 U.S.C. 154(b) by 0 days.

(21) Appl. No.: 12/083,256

(22) PCT Filed: Oct. 10, 2006

(86) PCT No.: PCT/GB2006/003762
§ 371 (c)(1),
(2), (4) Date: Feb. 5, 2009

(87) PCT Pub. No.: WO2007/042793
PCT Pub. Date: Apr. 19, 2007

(65) Prior Publication Data
US 2009/0196693 A1 Aug. 6, 2009

(30) Foreign Application Priority Data
Oct. 10, 2005 (GB) .................................. 0520573.7

(51) Int. Cl.
*E02B 9/08* (2006.01)
(52) U.S. Cl. ................. 405/76; 60/498; 290/42
(58) Field of Classification Search ............ 405/75, 405/76; 60/497, 498, 500; 290/42
See application file for complete search history.

(56) References Cited

U.S. PATENT DOCUMENTS

| 870,706 | A | * | 11/1907 | Woodard | 405/76 |
|---|---|---|---|---|---|
| 1,542,464 | A | | 6/1925 | McNeil | |
| 1,757,166 | A | | 5/1930 | Brady | |
| 2,715,366 | A | * | 8/1955 | Vartiainen | 405/76 |
| 2,783,022 | A | * | 2/1957 | Salzer | 405/76 |
| 3,335,667 | A | * | 8/1967 | Murphy | 405/76 |
| 4,206,601 | A | * | 6/1980 | Eberle | 405/76 |
| 4,698,969 | A | * | 10/1987 | Raichlen et al. | 405/76 |
| 4,984,935 | A | * | 1/1991 | de Oliveira Filho et al. | 405/76 |
| 5,499,889 | A | * | 3/1996 | Yim | 405/76 |
| 5,507,943 | A | * | 4/1996 | Labrador | 405/76 |
| 6,864,592 | B1 | | 3/2005 | Kelly | |
| 7,242,106 | B2 | * | 7/2007 | Kelly | 405/76 |
| 7,585,131 | B2 | * | 9/2009 | Oigarden et al. | 405/76 |
| 2007/0009325 | A1 | | 1/2007 | Oigarden et al. | |

FOREIGN PATENT DOCUMENTS

| FR | 2 532 691 A | 3/1984 |
|---|---|---|
| GB | 1 515 743 A | 6/1978 |
| WO | WO 01/06119 A | 1/2001 |
| WO | WO 2004/113718 A | 12/2004 |
| WO | WO 2005012723 A1 * | 2/2005 |
| WO | WO 2005/038246 A | 4/2005 |

* cited by examiner

*Primary Examiner* — Frederick L Lagman
(74) *Attorney, Agent, or Firm* — Harness, Dickey & Pierce, P.L.C.

(57) ABSTRACT

A structure for supporting wave energy conversion mechanisms driven by—floats (24, 25) placed in the sea, said structure comprising: an open sided lattice framework (15); at least one leg (16) for supporting said open sided lattice framework; members (20) which are supported by said lattice framework (15) for providing a platform, in use, above sea level for said wave energy conversion mechanisms; and a plurality of discrete protective containers (21, 22) affixed to said members (20) and each for housing at least part of a wave energy conversion mechanism (23).

14 Claims, 4 Drawing Sheets

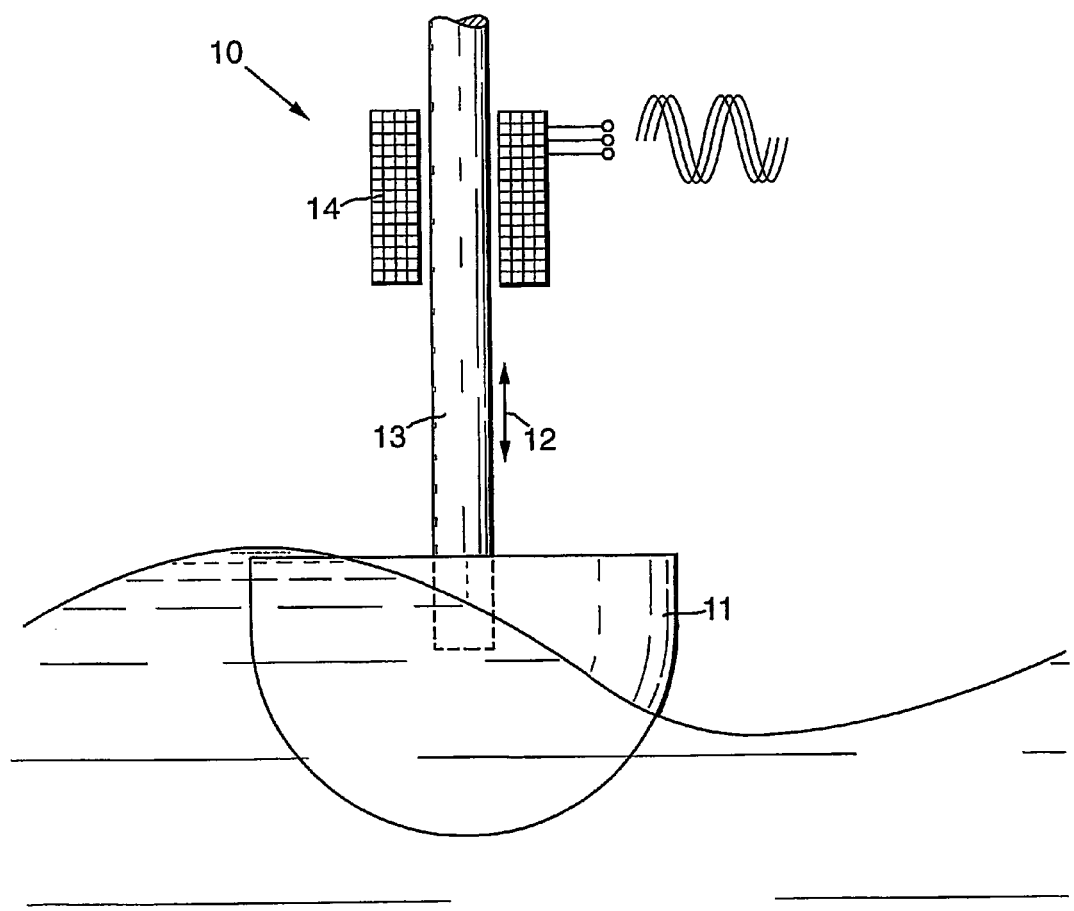

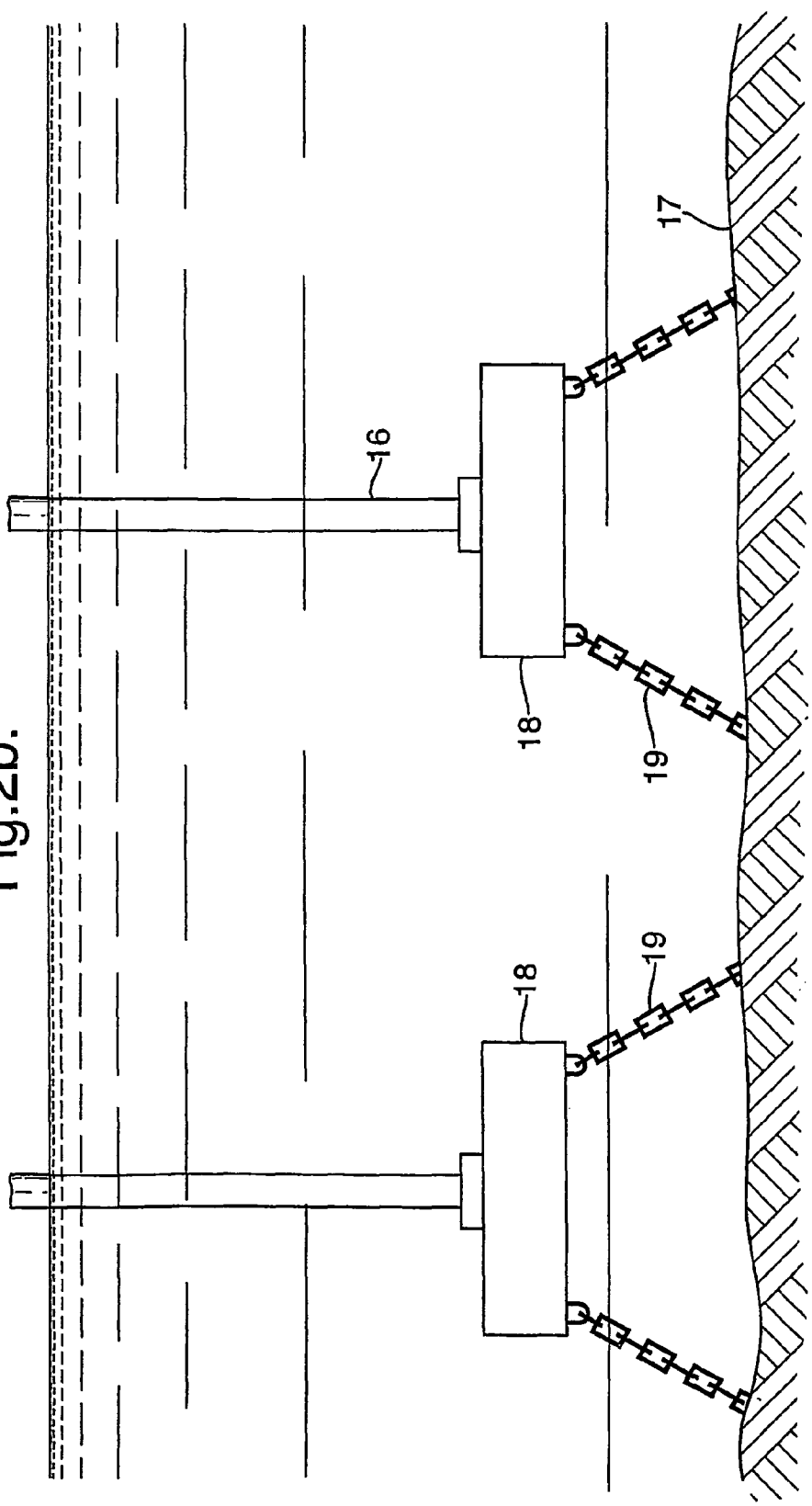

SUPPORT STRUCTURE FOR SEA WAVE ENERGY FARMS

CROSS-REFERENCE TO RELATED APPLICATIONS

Figure 2A:
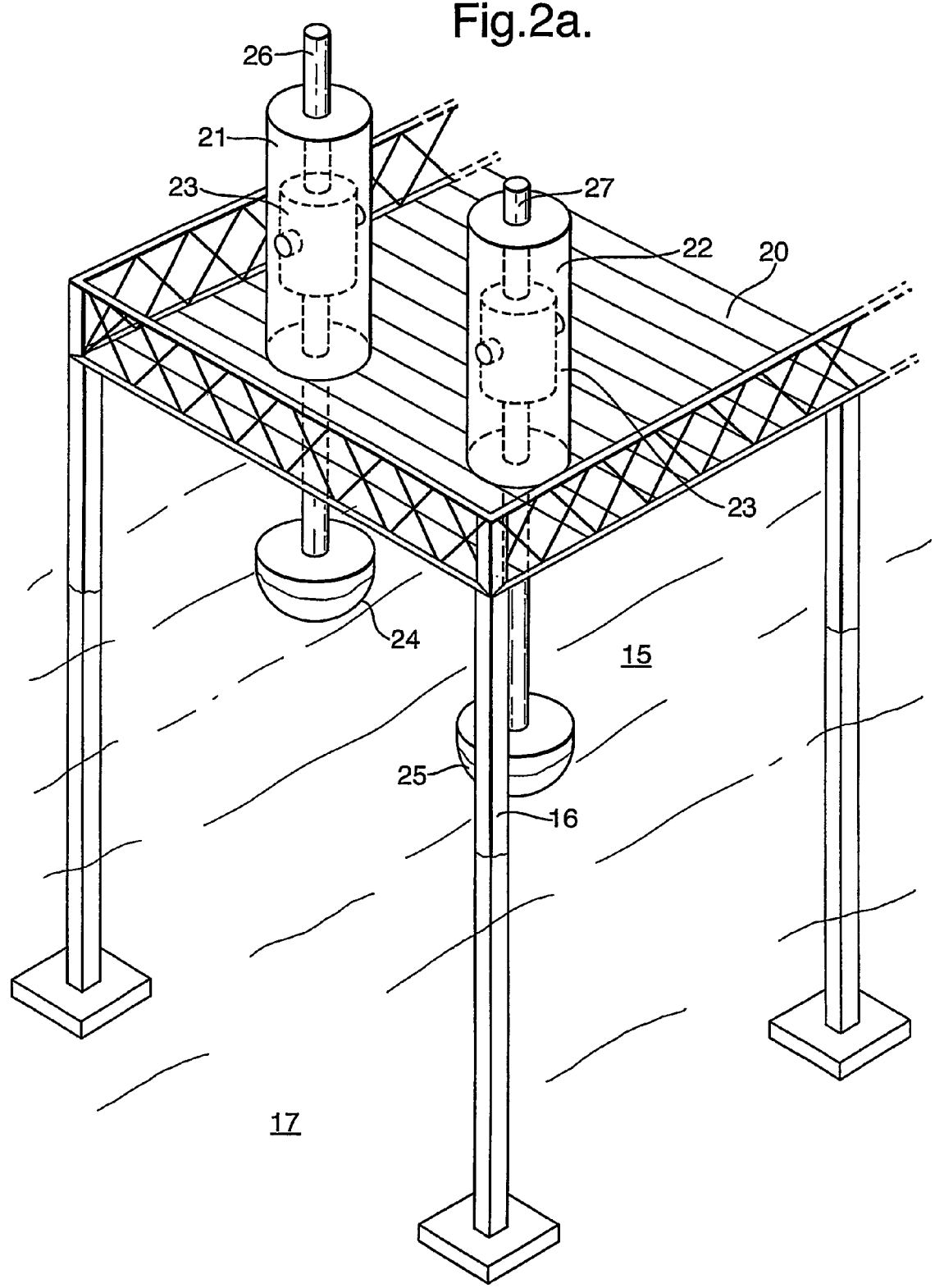

This application is a 371 National Stage of International Application No. PCT/GB2006/003762, filed Oct. 10, 2006 and published in English as WO 2007/042793 A1 on Apr. 19, 2007. This application claims the benefit of GB 0520573.7, filed Oct. 10, 2005. The disclosures of the above applications are incorporated herein by reference.

The following invention relates to structures situated in the sea for supporting and housing wave energy conversion devices.

There is a rapidly increasing need to exploit sources of renewable energy in order to reduce the current dependency on fossil fuels and their effects on global warming.

One of the greatest sources of renewable energy is the sea. Taking for example the United Kingdom, it has been estimated 25 to 40% of that country's electricity consumption could be provided by converting to electricity the power of sea waves present around its coastline.

In a granted patent of the applicant (EP 1 196 690 and foreign equivalents), which is hereby incorporated by way of reference, a sea wave energy conversion plant is described for capturing sea wave energy and converting it to electricity. In short, the plant uses floats, placed in the sea, which as they undulate up and down with the motion of the sea waves, cause relative motion between the stator and armature of one or more linear generators mounted above the floats and driven thereby, and thus the generation of electrical power.

It is readily apparent that a structure must be employed for supporting the linear generators in order that the stators thereof may be maintained stationary relative to the moving floats and their driven armatures.

A typical plant structure for this purpose may comprise a tower like framework with legs the lower ends of which rest, in the case of shallower seas on the seabed or in the case of deeper water, are supported by anchored submerged floatation chambers.

It is well known that any such structure placed in the sea can be subject to ferocious storm conditions and powerful forces. For a sea wave energy conversion plant to be both commercially and physically viable, it must be able to withstand these forces while at the same time protecting its wave-energy conversion mechanisms. It must be able also to withstand the impact of waves of exceptional height.

The present invention provides a structure for supporting wave energy conversion mechanisms driven by floats placed in the sea, said structure comprising: an open sided lattice framework; at least one leg for supporting said open sided lattice framework; members which are supported by said lattice framework for providing a platform, in use, above sea level for said wave energy conversion mechanisms; and a plurality of discrete protective containers affixed to said members and each for housing at least part of a wave energy conversion mechanism.

According to the invention, a structure for supporting wave energy conversion mechanisms driven by floats placed in the sea, comprises an open sided lattice framework, with legs for resting, in the case of shallow waters, on the seabed, or in the case of deeper waters, upon anchored submerged buoyancy chambers, the lattice framework supporting at or near its upper part, being above sea level, a series of horizontal members so as to provide platform supporting means for the said wave energy conversion mechanisms, the latter being contained within discrete protective containers of streamlined profile affixed to the horizontal members, the containers being spaced one from the other so as to permit the passage at least in part of waves there between.

By this means, upon the arrival for example of a freak wave, a substantial portion thereof may pass unimpeded through the lattice framework and in between the containers, so avoiding dangerous stresses upon the plant framework.

Preferably containers affixed closer to the outer side of said structure are stronger and/or more securely affixed than containers affixed closer to the centre of said structure. In this way those containers which take the brunt of any waves are more heavily reinforced than other containers thus saving weight and/or cost.

In an embodiment of the invention, where the wave energy converters are linear generators, the protective containers are in the form of vertical cylinders. The lower end of each of the cylinders is affixed by fastening means such as flanges, to the horizontal members spanning the width of the lattice framework.

In a feature of the embodiment, the wave energy converters are built into the structure of their protective cylinders, so as to form an integral unit, which may be readily lowered onto, or detached from, the horizontal member supporting means for installation, replacement and/or maintenance.

In a further feature of this embodiment, each cylinder may be equipped with heat engines for converting heat arising from the electrical losses within the coils of the linear generators to useful electricity.

The invention will now be described with reference to the accompanying drawings in which:

FIG. 1 shows a wave energy converter using linear generators.

FIGS. 2*a* and 2*b* show a lattice framework of the invention, placed in the sea for supporting such converters.

Figure 3:
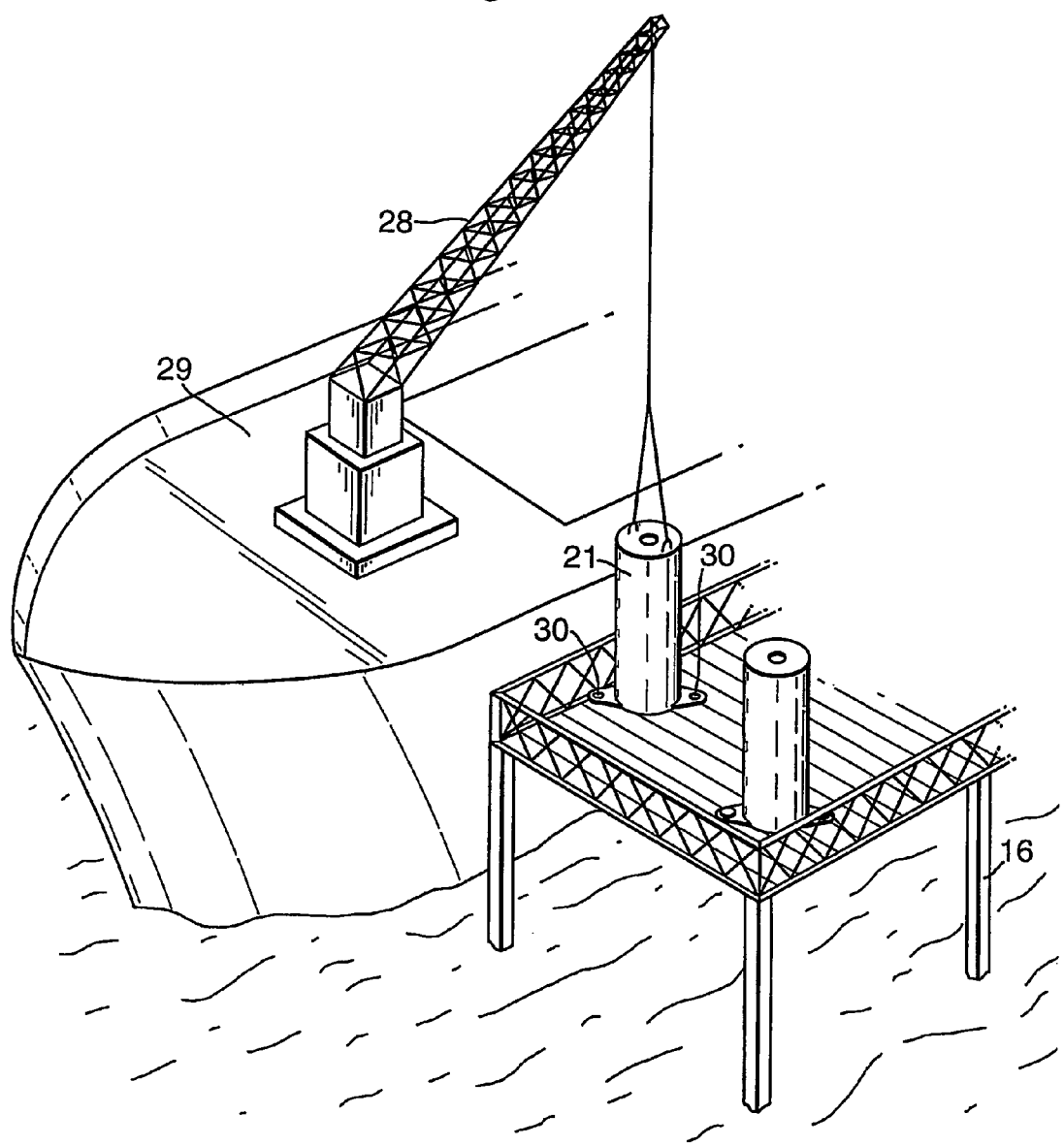

FIG. 3 shows the removal by a crane of a wave energy converter protective housing mounted upon the framework.

Referring to FIG. 1, a wave energy converter is shown generally at 10. A float 11, placed in the sea, undulates up and down with the motion of waves, as shown by the arrow 12. The float drives the moving component 13 of a linear generator through stationary coils 14. The relative movement results in electricity being generated.

Referring to FIG. 2*a*, a lattice framework is shown at 1S supported by its legs 16 resting upon the sea bed 17. Alternatively, the legs may be supported by buoyancy chambers 18, as shown in FIG. 2*b*. The chambers are submerged and are held to the sea bed in well known manner by anchoring chains, 19.

As can be seen, the framework is open sided, and is of the sort used to support oil rigs and piers. Being open sided, it permits the ready ingress and egress of sea waves incipient upon it. At the top of the structure are horizontal members 20, which in effect, provide a mounting platform for wave energy converter protective housings, two of which are shown at 21 and 22. The housings are of cylindrical cross section and provide mounting means for the stationary part 23 of a linear generator.

Passing through the housings 21 and 22 and extending down to floats 24 and 25 are the moving armatures 26 and 27 of the linear generators.

Because protection against the elements for each of the wave energy converters is afforded by a number of individual streamlined containers, rather than say one large overall housing, overall resistance to waves and wind acting upon the wave energy conversion plant is considerably lessened. For example, it can be seen from FIG. 2*a* that in the event of a freak wave bearing down upon the structure, it may pass readily through the framework and is arrested only minimally by the housings 21 and 22 on account of their circular cross section and the fact they are well spaced from one another.

In practice, the containers must be spaced apart sufficiently to provide space in between the floats directly beneath them. In general, because the room envelope occupied by the floats is considerably larger than the plan area occupied by the energy conversion mechanism, a spacing at least the same or larger than their plan area is necessary.

Referring to FIG. 3, a crane 28 mounted upon a ship 29, is shown removing one of the protective housings. This is effected by undoing fastening means 30 placed at the base of the housings for affixing them to the aforesaid horizontal members. By this means, it will be appreciated that the housings may be readily installed and removed, e.g. for maintenance.

Numerous variations will be apparent to those skilled in the art.

The invention claimed is:

1. A structure for supporting wave energy conversion mechanisms driven by floats placed in the sea, said structure comprising:
   an open sided lattice framework;
   at least one leg for supporting said open sided lattice framework;
   members which are supported by said lattice framework for providing a platform, in use, above sea level for mounting of said wave energy conversion mechanisms; and
   a plurality of discrete protective containers fixed relative to said members, each of said plurality of discrete protective containers defining an internal cavity for housing at least part of a wave energy conversion mechanism,
   wherein said wave energy conversion mechanisms are mounted to a structure of their protective containers, so as to form integral units, which may be readily lowered onto, or detached from, said members for at least one of installation, replacement and maintenance.

2. The structure of claim 1, adapted to be supported by the legs resting on the sea bed.

3. The structure of claim 1, further comprising at least one submerged buoyancy container attached to said at least one leg for being anchored to the sea bed and thereby to support said members and protective containers above sea level.

4. The structure of claim 1, wherein said containers substantially do not have any major flat surfaces upon their vertical portions.

5. The structure of claim 4, wherein said containers are of streamlined profile.

6. The structure of claim 5, wherein said containers are substantially in the shape of cylinders.

7. The structure of claim 1, wherein said containers are spaced from one another by at least one times their maximum plan dimension.

8. The structure of claim 1, wherein the containers are spaced one from the other so as to permit the passage at least in part of waves and/or wind there between.

9. The structure of claim 1, further incorporating linear generator wave energy conversion mechanisms.

10. The structure of claim 9, wherein each cylinder is equipped with heat engines for converting heat arising from the electrical losses within the coils of the linear generators to useful electricity.

11. The structure of claim 1, wherein said containers are each for housing a transducer of a wave energy conversion mechanism.

12. The structure of claim 1, wherein containers affixed closer to the outer side of said structure are stronger and/or more securely affixed than containers affixed closer to the centre of said structure.

13. The structure of claim 1, wherein a stationary portion of each of the wave energy conversion mechanisms are spaced apart from the platform.

14. A structure for supporting wave energy conversion mechanisms driven by floats placed in the sea, comprises an open sided lattice framework, with legs for resting, in the case of shallow waters, on the seabed, or in the case of deeper waters, upon anchored submerged buoyancy chambers, the lattice framework supporting at or near its upper part, being above sea level, a series of horizontal members so as to provide platform supporting means for the said wave energy conversion mechanisms, the latter being contained within discrete protective containers of streamlined profile affixed to the horizontal members, the containers being spaced one from the other so as to permit the passage at least in part of waves there between,
   wherein the wave energy conversion mechanisms are built into the structure of their protective containers, so as to form an integral unit, which may be readily lowered onto, or detached from, the horizontal members for at least one of installation, replacement, and maintenance.

* * * * *